Aug. 18, 1953        T. R. BREUNICH        2,648,978
FATIGUE TESTER WITH MEAN POSITION CONTROLLER
Filed June 8, 1950        4 Sheets-Sheet 1

INVENTOR
THEODORE R. BREUNICH
BY
ATTORNEY

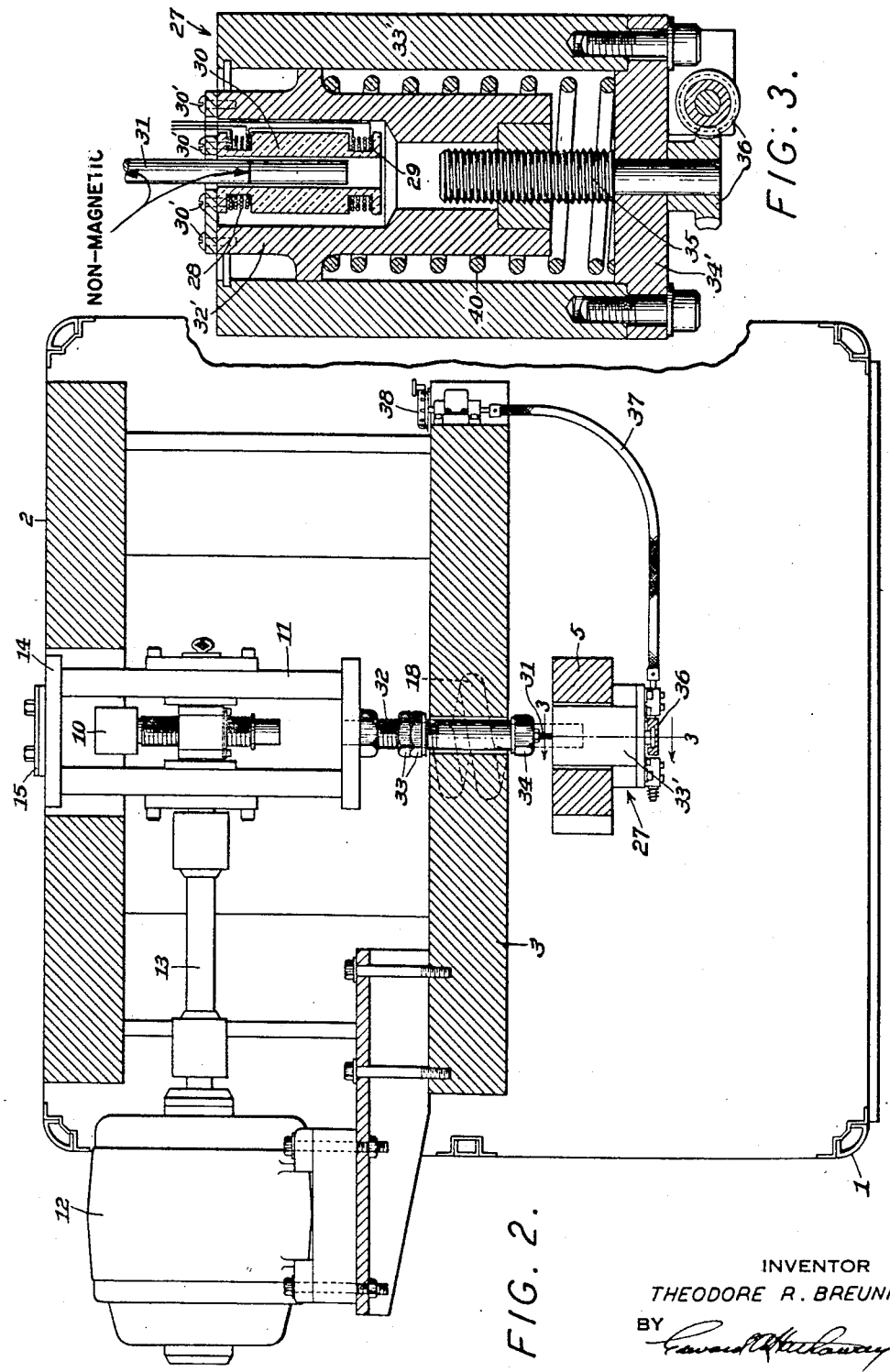

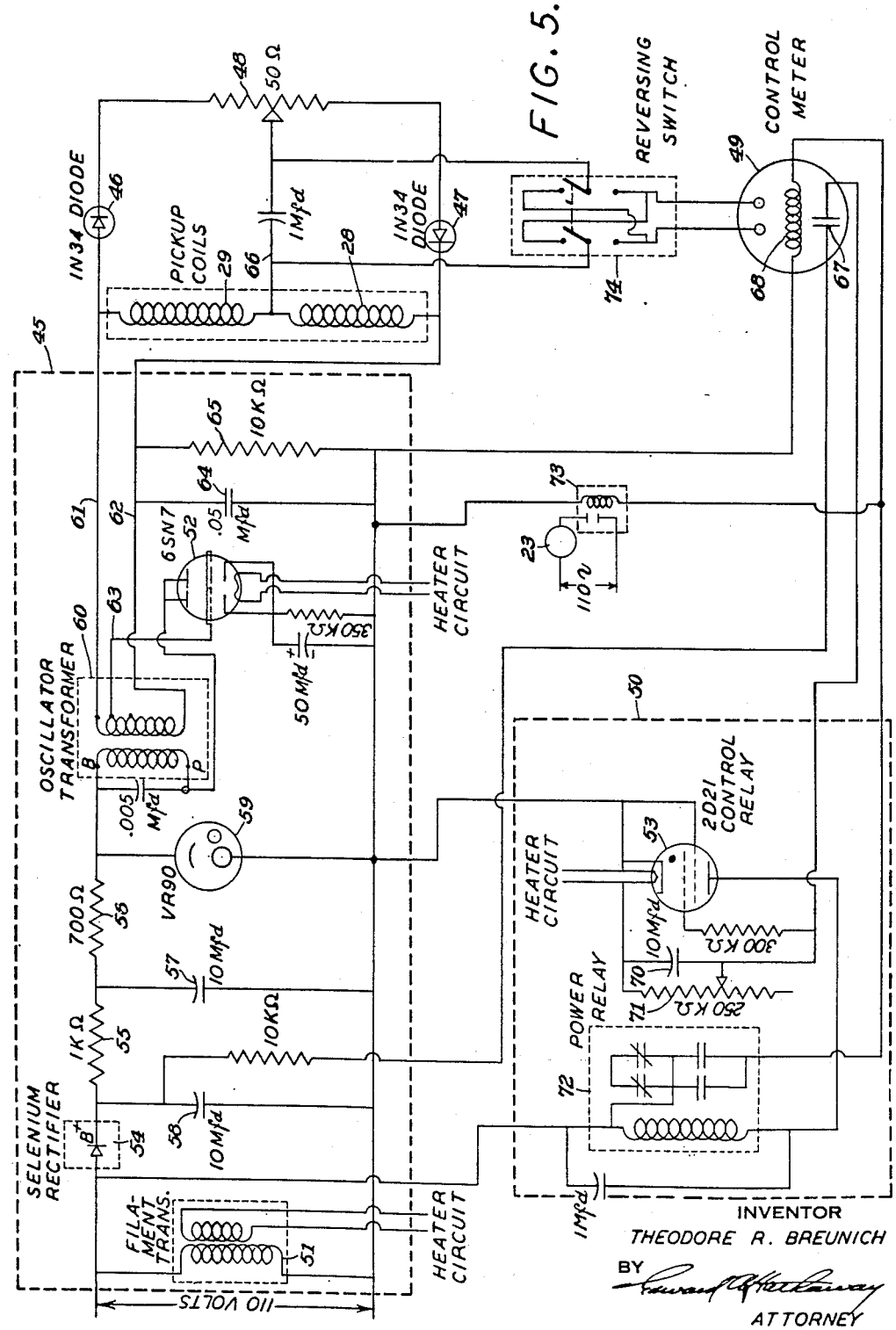

Aug. 18, 1953  T. R. BREUNICH  2,648,978
FATIGUE TESTER WITH MEAN POSITION CONTROLLER
Filed June 8, 1950  4 Sheets-Sheet 4
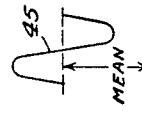
FIG. 6.
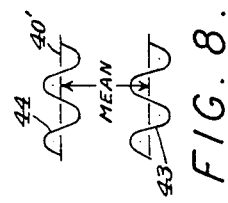
FIG. 7.
FIG. 8.
FIG. 9.
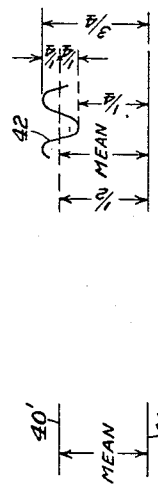
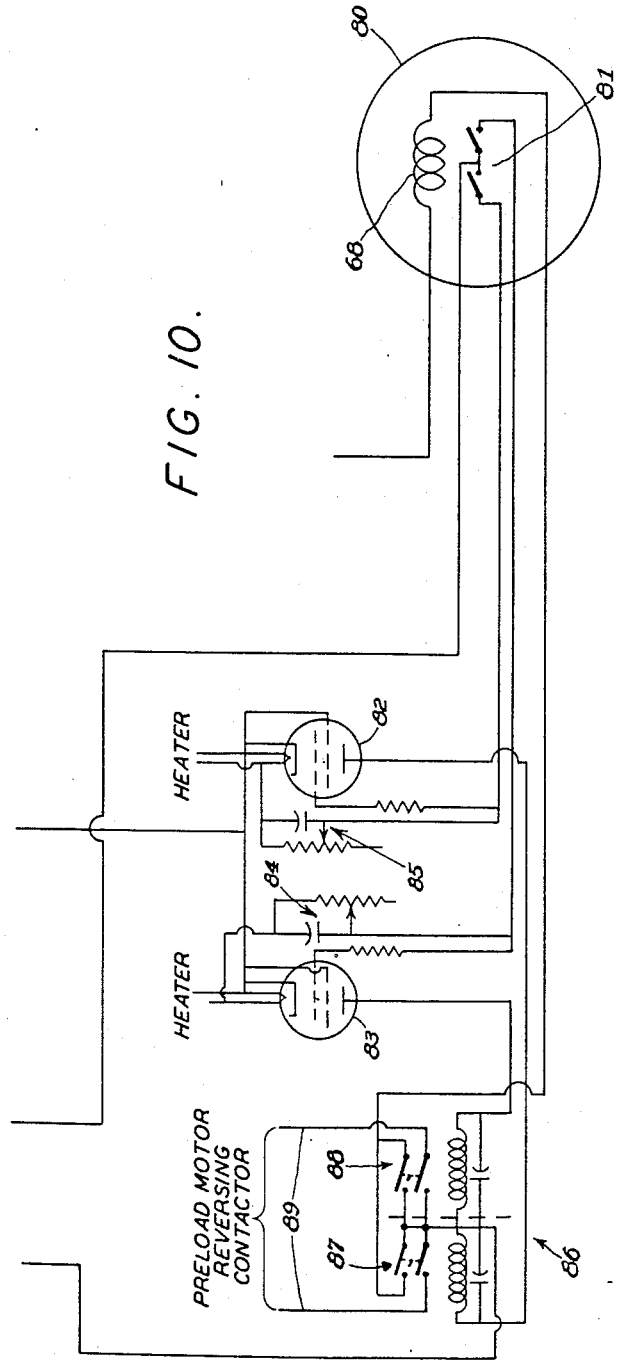
FIG. 10.
INVENTOR
THEODORE R. BREUNICH
BY
ATTORNEY Patented Aug. 18, 1953

2,648,978

UNITED STATES PATENT OFFICE 2,648,978

FATIGUE TESTER WITH MEAN POSITION CONTROLLER

Theodore R. Breunich, Stamford, Conn., assignor to Baldwin-Lima-Hamilton Corporation, a corporation of Pennsylvania Application June 8, 1950, Serial No. 166,837

6 Claims. (Cl. 73—67)

This invention relates generally to position controllers and it is an object of my invention to provide an improved position controller for detecting, measuring and controlling the mean position of a vibratory element.

Certain applications of my improved mechanism are for controlling static pre-load on vibrating bodies and for detecting creep or slippage of a vibrating body such as a specimen subjected to an alternating force in fatigue testing machines, one form of which, among others that might be employed, is shown in Lazan Patent No. 2,486,567. Usually in a machine of this type the specimen, whether in tension, compression, bending, etc., is subjected to an initial pre-load on which the vibratory force is superimposed. As the specimen grips slip or as a specimen weakens during the course of its test, the initial pre-load force decreases, or the specimen may become heated in which case the initial pre-load increases, and it is desirable in any of these cases to maintain this pre-load at its initial value or at some predetermined value, although, on the other hand, it is not desired to have the initial pre-load value affected merely by changes in the amplitude of vibration if such should occur during the course of a test.

Other objects and advantages will be more apparent to those skilled in the art from the following description of the accompanying drawings in which:

Fig. 2 is a sectional view of Fig. 1 taken in a plane at right angles thereto through its vertical axis;

Fig. 3 is a sectional view taken substantially on the line 3—3 of Fig. 2 showing the position controller and its sensing device;

Fig. 5 is a detailed wiring diagram of the position controller;

Figs. 6 to 9 diagrammatically illustrate how a mean distance is maintained under varying vibratory conditions; and Fig. 10 is a modified circuit for two-way control.

Figure 1:
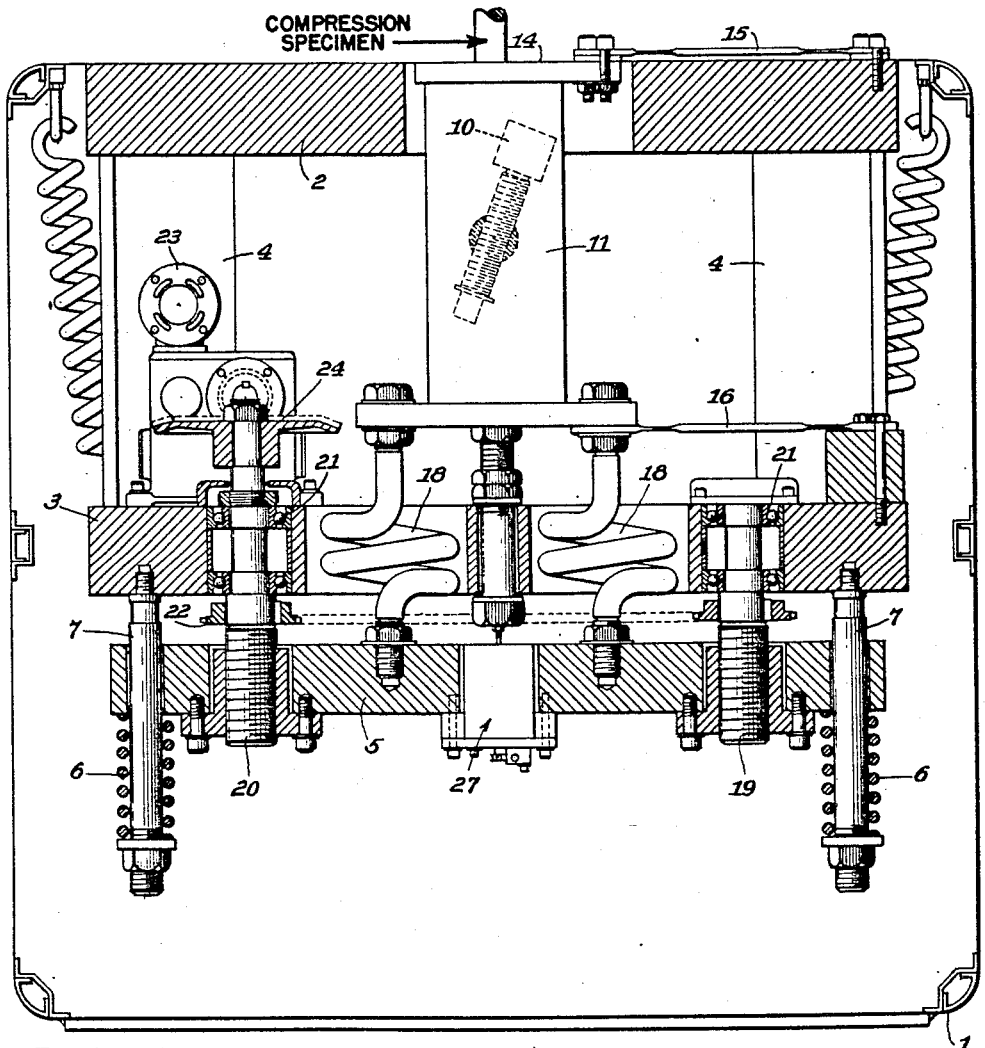
Fig. 1 is a fragmentary sectional view of a fatigue testing machine operated in accordance with the principles of the invention disclosed in said Lazan patent.
Figure 4:
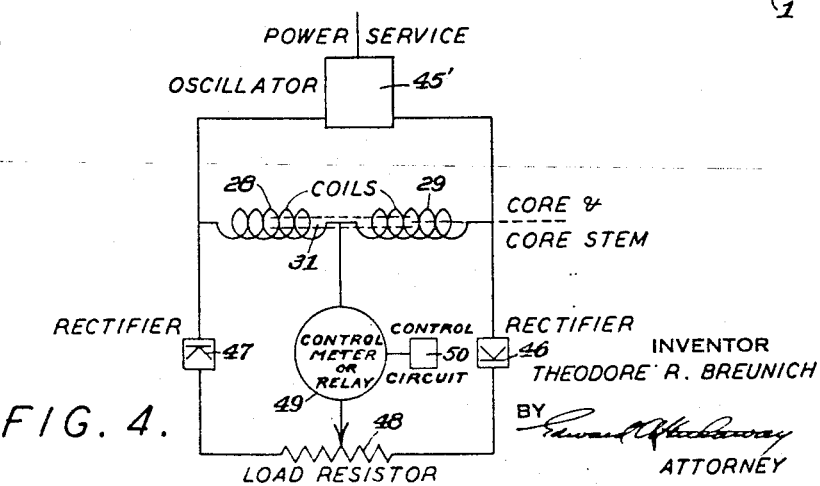
Fig. 4 is a schematic wiring diagram of the position controller.

Briefly, the fatigue testing machine specifically disclosed herein to illustrate one particular application of my position controller is of the general type disclosed in said Lazan Patent 2,486,567 and comprises, as shown in Fig. 1, a casing 1 having a stationary, but seismic mounted, frame including upper and lower horizontal members 2 and 3 rigidly joined together by vertical columns 4, and an adjustable pre-loading member 5 which is supported through springs 6 and pins 7 by frame member 3. A vibratory force is generated by a centrifugal weight 10 rotatably supported in a vertical vibratory frame 11 and driven by an electric motor 12 and flexible shaft 13. The vibratory frame 11, provided with a small platen 14, is laterally guided by upper and lower sets of flex plates 15 and 16. Suitable specimen engaging fixtures as illustrated in said Lazan patent are connected to the vibratory platen 14 and to the top surface of the relatively stationary frame member 2. To compensate for inertia forces, combined tension-compression type of springs 18 are connected to the vibratory frame and to the adjustable pre-loading member 5. These springs function not only for inertia compensating purposes, but also for assisting in pre-loading a specimen. To adjust the pre-load, a pair of screws 19 and 20 are threadedly connected to member 5 and are journalled at 21 in lower frame member 3. To commonly drive these screws, a chain and sprocket connection 22 is provided while the screw 20 has an extension which is driven by a motor 23 and suitable gearing 24.

My improved position controller includes an adjustable position-sensing device generally indicated at 27 supported upon the adjustable frame member 5 and has, as shown in Fig. 3, a pair of coils 28 and 29 disposed in a suitable non-magnetic coil form 30. A core 31 of magnetic material is dependently rigidly supported from frame 11 by a relatively heavy rod 32 having upper and lower adjustable limit stop nuts 33 and 34 disposed on opposite sides of frame member 3. The core 31 thus moves with vibratory frame 11 so that the mean position of the vibratory frame, and hence the specimen, may be determined and controlled through an electrical circuit to be presently described. To support and adjust the sensitive element, the coil form 30 is rigidly mounted by screws 30' in a sleeve 32' guided in a bore of a cylindrical casing 33' whose lower end is closed by a suitable plate 34' in which is journalled an adjusting screw 35 threaded in sleeve 32'. The screw is suitably rotated by gears 36 connected through a flexible shaft 37 to a manually operated wheel 38. To take up backlash in screw threads 35, a spring 40 biases the sleeve 32' upwardly.

To understand certain principles involved in the operation of my improved position controller, we may assume, for sake of illustration, that the preloading means 19 and 20 causes sufficient initial preloading of springs 18 so as to deflect a specimen, say, ½" statically and that upon operation of centrifugal weight 10 the force produced thereby vibrates frame 11 ±¼". In this case the springs 18 deflect from ¼" to ¾" but the mean deflection is ½". In other words, the static deflection and the mean of the vibratory deflection are the same. It is further assumed that the position sensing device 27 has been so adjusted by screw 35, Fig. 3, so that core 31 will reciprocate between coils 28 and 29 in a manner to produce equal and opposite alternating signals, specifically shown herein as a sine wave, from these coils so long as the ½" mean deflection is maintained and thereby not be affected by the vibratory motion because the equal and opposite signals will oppose or null each other in the control circuit to be described. Also, the amplitude of vibration may change as a specimen weakens but this does not necessarily require any change in the ½" mean deflection initially established by the preloading action. The foregoing is graphically illustrated in Figs. 6 to 9. The upper line 40' may represent vibratory frame 11, and the lower line 41 may represent pre-loading platen 5, spaced apart a predetermined distance to establish a desired initial static pre-load. This distance is indicated as the "mean" distance. If now frame 11 is vibrated ±¼", as shown by the curve 42, Fig. 7, the mean distance remains the same, although the deflection of springs 18 will vary from ¼" to ¾" (i. e., the mean of ½"±¼"). Similarly, if the lower end of springs 18 should vibrate along a curve 43, Fig. 8, together with simultaneous vibration of the upper end of the springs at the upper line 40', as shown by curve 44, the mean distance will still remain constant. If the amplitude of vibration should change, as indicated by curve 45, Fig. 9, the mean distance would continue to remain constant.

These diagrams illustrate that so long as the initial distance between the two lines 40' and 41 (or the two bodies 11 and 5) remains unchanged, the controller is unaffected by vibratory motion, or by change in its amplitude or in its phase angle. However, if the mean distance is varied either by weakening of the specimen, or by slippage of specimen grips or length change due to thermal conditions, the controller will indicate and/or control, as the case may be, when this distance has been so changed.

If the machine is operating as desired, the vibrating frame 11 will be maintained at a desired mean distance from platen 5 in which case the core 31 causes equal and opposite signals to be produced by coils 28 and 29, as previously mentioned. These coils are energized by a constant frequency carrier wave from an oscillator 45'. The carrier frequency should be preferably from 15 to 20 times the operating frequency of frame 11 to eliminate the possibility of interference between the signal and the carrier. The motion of core 31 modulates the carrier signal which modulation is rectified by rectifiers 46 and 47 and fed through a load resistor 48 and a control meter or relay 49. Under this balanced or nulled condition, meter 49 receives no differential signal and consequently does not effect any change of position. Assuming now, that the mean position of core 31 changes for any one of the various reasons heretofore given, the signal generated by coil 28 and the signal generated by coil 29 are no longer balanced and accordingly the rectified components of these signals no longer balance or null each other. This unbalance actuates control meter or relay 49. In the case of a meter, an indication is given. If the meter is of the relay type or if a relay is used instead, a control circuit 50 is actuated to initiate operation of motor 23 which changes the position of pre-load platen 5 through the operation of screws 19 and 20. The static pre-load is thus continued to be changed until the mean position between platen 5 and vibratory frame 11 is re-established to the initial amount.

I have shown in Fig. 5 one specific wiring diagram and component elements that may be used, among possible others. I have also inserted in brackets, the type number of specific tubes that have been used in my improved control circuit although other equivalent tubes may be used.

Standard 110 volts 60 cycle power is used for primary power. A filament transformer 51 steps this down to 6.3 volts for use on the heaters of tubes 52 and 53 (6SN7 and 2D21). It is rectified by means of a selenium rectifier 54 and the resulting D. C. voltage filtered and smoothed out by a 1000 ohm and 700 ohm resistors 55 and 56 and two 10 mfd. condensers 57 and 58. The voltage resulting is regulated by the voltage regulating tube 59 VR90.

The above represents the power pack section of the oscillator unit and is used to supply the remaining components of the controller. The D. C. voltage of this power pack is impressed, through the primary of an oscillator transformer 60 on the plates of the oscillator tube 52 (6SN7). The secondary of the transformer supplies through wires 61, 62 the carrier frequency for the pick up coils 28 and 29 and a tap 63 on the winding connected to the grid of the oscillator tube 52 completes the resonant circuit. Controlled feedback by means of the condenser 64 (.05 mfd.) and resistor 65 (10,000 ohm) gives added stability and reduces the voltage impressed on the pick-up coils.

The voltage across the two pick-up coils is passed through rectifiers 46 and 47 and the load resistor 48 (50 ohm), all in series. The control meter 49 is connected to the common connection 66 of the coils and the load resistor giving a Wheatstone bridge type circuit. Each coil is in one leg and each rectifier in the other two. The load resistor is used to adjust initial unbalance in the bridge and from then on the coils control the bridge balance. The control meter 49 is connected across the bridge and any unbalance causes a current flow.

This is indicated on the meter and closes a sensitive switch 67 for indication and control purposes. The meter switch is a magnetic closing type and must be reset by a solenoid 68. In order to protect the sensitive switch 67 and also to reset it, the thyratron type tube 53 (2D21), is used as a control relay. To reduce the frequency of resets, a time dwell is included consisting of control relay 53 and a condenser-resistor discharge circuit 70 and 71. By adjusting the value of resistance 71, the time delay period can be varied from zero to about 10 seconds for the particular combination shown.

When the meter switch 67 closes it charges the condenser 70 in the grid circuit of tube 53 and also fires this tube. When this tube fires, a power relay 72 operates to reset meter 49 through solenoid 68, thereby closing the power contactor 73. When the meter resets, the grid circuit of tube 53 opens but this tube is kept firing by the discharge of condenser 70 through the adjustable resistor 71. The time of this discharge is controlled by the resistor setting, so the time delay or dwell between resets can be adjusted to suit the operating characteristics of the machine such as the stiffness of springs 18 and the rate of pre-load follow-up by motor 23 and its connecting gearing.

The advantage of this circuit is high sensitivity in the control meter, eliminating the need for amplification, and the chance to adjust the control response to different types of auxiliary power equipment such as the springs and follow-up just described. This particular arrangement is adapted for one-way follow-up of weakening, creep, etc., of the specimen in one direction. If the specimen characteristics should initially require a follow-up action in the opposite direction, the control system may be easily reversed by a reversing switch 74.

However, to use automatic reversing, I have provided as shown in Fig. 10, a control meter 80 corresponding to meter 49 but having instead two contacts 81 controlling two control relays 82 and 83 corresponding generally to relay 53. Also two time delay circuits 84 and 85, corresponding to circuit 70 and 71, control a three position relay 86. Relay 82 fires when the mean position is low thereby closing contacts 87 causing motor 23 to adjust pre-loading platen 5 in one direction. Control relay 83 fires when the mean position is high thereby closing contacts 88 to adjust platen 5 in the opposite direction. It will of course be understood that the leads 89 from relay 86 are connected to a usual reversing contactor of motor 23 thereby eliminating the manually operated switch 74. The remainder of the circuit is the same as shown in Fig. 5.

It will of course be understood that various changes in details of construction and arrangement of parts may be made by those skilled in the art without departing from the spirit of the invention as set forth in the appended claims.

I claim:

1. The combination comprising means deflectable for statically pre-loading a specimen so that the specimen is initially deflected a predetermined amount, means for subjecting the specimen to a vibrating force superimposed upon the static force so that the specimen deflection is alternately increased above and decreased below said static deflection as a mean, means for sensing variations in the mean deflection of the pre-loading means from a predetermined average value, and means controlled by said sensing means for adjusting the pre-loading means to maintain a predetermined average pre-load force.

2. The combination set forth in claim 1 further characterized in that the means for adjusting the pre-load means includes a servo-motor, and the sensing means includes an electric circuit for controlling said servo-motor.

3. The combination as set forth in claim 1 further characterized in that the means for adjusting the pre-load means includes an electric motor, and the sensing means includes an electrical circuit for operating said motor to adjust the pre-load.

4. The combination set forth in claim 1 further characterized in that the sensing means includes electrical means for producing balanced electrical signals of opposed polarity so long as the mean deflection of the pre-loading means is maintained and for producing unbalanced signals upon variations from said mean, and said sensing means also having provision to produce sufficient inertia in its responsiveness so that it is actuated only upon occurrence of the unbalanced signals.

5. The combination set forth in claim 1 further characterized in that the sensing means includes a pair of opposed electrical impedance elements and means connected to the specimen for causing said impedance elements to produce opposed balanced signals so long as the mean deflection of the specimen is maintained and to produce unbalanced signals upon variations from said mean, and the sensing means also includes an electrical circuit having provision whereby the circuit is responsive only to said unbalanced signals.

6. The combination set forth in claim 1 further characterized in that the sensing means includes a pair of opposed electrical impedance elements and means connected to the specimen for causing said impedance elements to produce opposed balanced signals so long as the mean deflection of the specimen is maintained and to produce unbalanced signals upon variations from said mean, and the sensing means also includes an electrical circuit having a pair of thyratron tubes which are fired by the unbalanced signals whereby the circuit is responsive only upon occurrence of such unbalance.

THEODORE R. BREUNICH.

References Cited in the file of this patent

UNITED STATES PATENTS

| Number | Name | Date |
|---|---|---|
| 2,317,097 | Eksergian | Apr. 20, 1943 |
| 2,350,722 | Buckingham | June 6, 1944 |
| 2,357,745 | Kliever | Sept. 5, 1944 |
| 2,359,927 | Melas | Oct. 10, 1944 |
| 2,436,317 | Manjoine | Feb. 17, 1948 |
| 2,486,567 | Lazan | Nov. 1, 1949 |
| 2,548,381 | Lazan | Apr. 10, 1951 |